United States Patent [19]

Horak

[11] 4,445,627

[45] May 1, 1984

[54] APPARATUS AND METHOD FOR ADJUSTMENT OF VOLUMETRIC CAVITIES FOR GRAVIMETRIC METERING OF LIQUIDS

[76] Inventor: Vladimir Horak, 353 High St., Closter, N.J. 07624

[21] Appl. No.: 308,585

[22] Filed: Oct. 5, 1981

[51] Int. Cl.$^3$ .............................................. B67D 5/06
[52] U.S. Cl. ........................................ 222/54; 73/429
[58] Field of Search .................... 73/426, 429; 222/54, 222/64, 63, 68, 14, 23, 21, 52; 364/557, 558

[56] References Cited

U.S. PATENT DOCUMENTS

| | | | |
|---|---|---|---|
| 2,836,066 | 5/1958 | Brown | 73/429 X |
| 3,190,117 | 6/1965 | Whiteman | 73/223 |
| 3,827,610 | 8/1974 | Stiefel, Jr. | 73/429 X |
| 4,033,190 | 7/1977 | Hudspeth | 73/426 |

Primary Examiner—Stanley H. Tollberg
Attorney, Agent, or Firm—Edward F. Levy

[57] ABSTRACT

Gravimetric apparatus is provided to mechanically adjust the internal capacity of a volumetric liquid dispensing cavity, such as a metering cavity, to compensate for decrease in density and expansion of said liquid at ambient temperatures above the temperature of maximum density of said liquid. The apparatus includes a liquid displacing member, preferably in the form of an elongated bar which is inserted into the liquid metering cavity to decrease the volumetric capacity thereof, and which may be moved manually or automatically inwardly or outwardly of the cavity to vary the capacity of the cavity in such a manner that it will always contain a volumetric charge of liquid having a weight equal to the same charge of liquid at its maximum density. Automatic control of the liquid displacement member is provided by a temperature sensing element which monitors the temperature of the liquid during the metering operation and transmits such information to a microcomputer having a memory in which the temperature/density function characteristics of the liquid is stored. The microcomputer is operatively coupled to the temperature sensing element for moving it in selected increments.

8 Claims, 3 Drawing Figures

APPARATUS AND METHOD FOR ADJUSTMENT OF VOLUMETRIC CAVITIES FOR GRAVIMETRIC METERING OF LIQUIDS

The present invention relates to improvements in liquid dispensing systems, and in particular relates to a novel and improved structure for compensating for differences in liquid density during the dispensing operation.

There are various systems available today for dispensing liquids in precise quantities, particularly in the chemical industry, food industry, and the like. My prior U.S. Pat. No. 3,960,295 discloses, for example, a system of proportioning two or more liquids in precise ratios. My U.S. Pat. No. 4,284,210 discloses a system for metering a single liquid in precise selected amounts. In both of these systems, the necessity for using pumps or other mechanical feeding devices is eliminated, and the liquid is dispensed from a tank by gravity or by pressure, its rate of flow being regulated by an outlet valve on the tank, and the volume of liquid dispensed being regulated by liquid level sensors in the tank. There are other systems commercially available which also operate by volumetric feed, that is, wherein a measured volume of liquid is dispensed by gravity flow or by pressure flow.

An inherent difficulty in all of such volumetric feed systems is the inherent characteristics of liquids to change in density and therefore increase or decrease in volume in proportion to changes in temperature. In general, it is established that the higher the temperature of a liquid, the lower is its density, and consequently a larger volume is required to achieve the same weight. For example, one liter (1000 ml.) of water has its highest density at 4° C. (which nay be designated as a density of 1). If the temperature of this same liter rises to 50° C., the density of the water declines to 0.9880 and the volume rises to 1012 ml. Thus the volume of the water has expanded by the higher temperature, and therefore if one liter of water is dispensed at 50° C. by volumetric measurement, the measurement will be inaccurate by 12 ml or by 1.2%. If it is desired to obtain precisely one liter of water by weight, the volumetric amount measured at 50° C. would have to be increased by 12 ml. resulting in a volume of 1012 ml.

In liquid metering systems, therefore, where a liquid is dispensed volumetrically, changes in ambient temperature will have a severe adverse effect on the accuracy of the metering operation. For example, in the metering system shown in the aforementioned U.S. Pat. No. 4,284,210, the liquid is fed into a dispensing tank to a preselected level determined by a liquid sensor which halts the feed when this "full" level is reached. When the liquid is then dispensed to a point of use, it flows by gravity or pressure through an outlet valve until its level reaches a preselected point, at which time a second sensor closes the outlet valve and a selected volume, for example, one liter, will have been dispensed. This apparatus is calibrated to dispense one liter by volume at normal room temperature of approximately 20° C. If the room temperature changes from time to time, or from season to season, the density of the volumetric liters dispensed will change in density accordingly, so that the measured liters may vary significantly in weight.

Such inaccuracies are aggrevated by the fact that different liquids are subject to different changes in density proportional to temperature changes. This is a particular problem where different liquids are proportioned or blended in precise amounts, as shown in the system of my aforementioned U.S. Pat. No. 3,960,295. In this patent, volumetric measurements of liquids are dispensed from separate tanks and are mixed in a selected ratio. Under temperature changes, the densities of the liquids change in different degrees which renders the proportioning inaccurate.

Attempts to compensate for the tendency of liquids to change density under changes in temperature have resulted in the so-called "gravimetric control" of liquids dispensed. In such a system, the liquid is dispensed according to weight, rather than volume, so that the weight of the dispensed charge is always constant regardless of temperature, and regardless of the density of the liquid at the time it is dispensed. Such gravimetric dispensing is conventionally accomplished by sensitive and costly weighing equipment which operates either by comparison with known weights, easuring of deflection of a body, measuring the hydraulic or pneumatic pressure used to support the unknown weight, measuring the electric current in a coil whose magnetic field supports the unknown weight, or measuring the displacement of the liquid into which a floating body has been immersed.

The difficulty with such gravimetric operation is that weighing machines presently employed are limited in capacity. Each is designed to weigh loads in specific catagories, for example, up to 1000 pounds, 5000 to 8000 pounds, etc. Heavier loads than that for which the mechanism is designed can damage the sensitive weighing mechanism, while the accuracy of the weighing mechanism in measuring much smaller loads would be extremely low. In addition, it is well-known that the delicate mechanical parts of the scales are subject to physical damage and require periodic checking, recalibration and repair. A further disadvantage is that production lines requiring gravimetric operation are very slow and therefore expensive. The metering operation cannot be speeded up because of the final stage of fluid flow.

It is an object of the present invention to provide volumetric measurement liquid dispensing apparatus with means to adjust the volumetric measurement to that of gravimetric measurement so that the apparatus will dispense the liquids by weight of the selected charge, regardless of the temperature of the liquid during the dispensing operation. This is accomplished without the use of weighing equipment or other complex apparatus which is presently in use for gravimetric control of liquids.

Another object of the invention is to provide liquid dispensing apparatus of the type described which includes means for varying the internal volumetric capacity of the metering cavity to compensate for changes in the density of the liquid being dispensed at the ambient temperatures of the dispensing operation.

The volumetric capacity of the metering cavity is varied by means of a liquid displacement member of uniform cross-sectional area which is inserted into the dispensing cavity to decrease the volumetric capacity thereof, and is then selectively moved inwardly or outwardly of the cavity in precise increments to vary its volumetric capacity in proportion to the density of the liquid being dispensed at its ambient temperature during the dispensing operation. The liquid displacement member may be an elongated rod which is mounted above said dispensing cavity for movement into and out of said cavity. The movement of the rod may be accomplished manually, or may be performed automatically by means of a microcomputer having a memory in which is stored the temperature/density function characteristics for the liquid being dispensed.

Additional objects and advantages of the invention will become apparent during the course of the following specification when taken in connection with the accompanying drawings in which.

Figure 1:
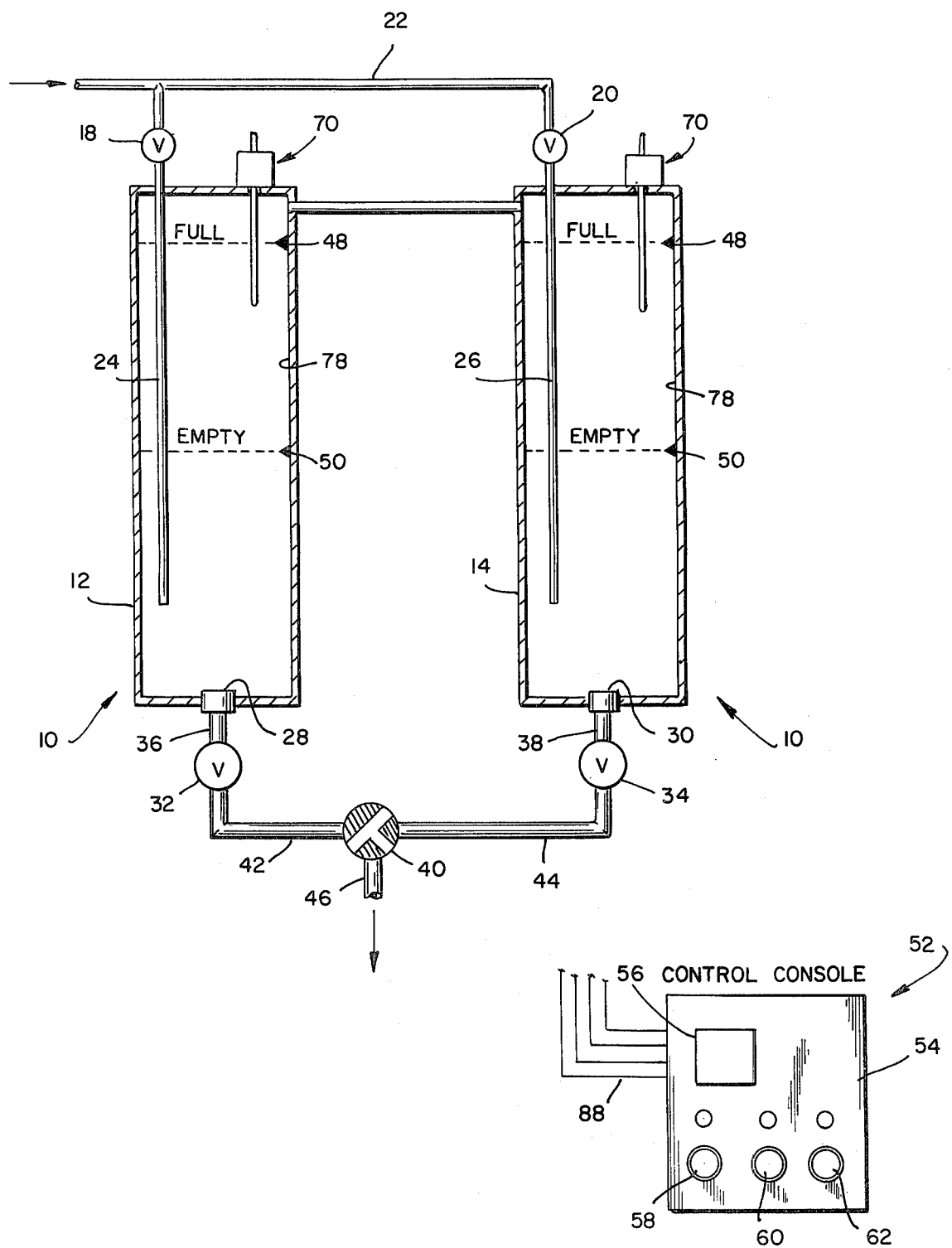
FIG. 1 is a schematic side elevational view of static metering pump incorporating the gravimetric adjustment assembly of the present invention.

Referring in detail to the drawings, there is shown in FIG. 1 a static metering pump 10 of the type illustrated and described in my U.S. Pat. No. 4,284,210. The static metering pump 10 includes a pair of tanks 12, 14 which are connected by a tube 16, so that air or other gas can flow from one tank to the other. The static metering pump 10 also includes a pair of electrically operated intake valves 18, 20 which are fed via an intake tube 22. The intake valves 18, 20 are connected to tubes 24, 26, which terminate in the lower portions of tanks 12, 14, respectively, thereby minimizing the creation of turbulence during the filling of the tanks 12, 14.

The tanks 12, 14 each include a replaceable orifice member 28, 30 which may be replaced by pairs of different orifice members of similar construction having openings of various sizes, thereby enabling the static metering pump 10 to meter liquids of differing viscosity.

The orifice members 28, 30 lead to a pair of electrically-operated outlet valves 32, 34 via tubes 36, 38. The outlet valves 32, 34 are connected to an electrically-operated three-way valve 40 via tubes 42, 44. The three-way valve 40 discharges the metered liquid via a tube 46.

Each tank 12 and 14 also includes an electrically-operated liquid level control system, including a pair of liquid level sensors 48 and 50, the upper sensor 48 being fixed and the lower sensor 50 being adjustable in order to regulate selectively the volumes of liquid dispensed from said tanks. Each sensor 48 and 50 may be of any of conventional and well-known type which is responsive to the arrival of the level of liquid at its pre-set height, to thereby actuate a switch and close an electrical circuit. The sensor 48 and 50 are shown schematically herein since their particular construction constitutes no part of the present invention. By way of example, however, the sensors may be of the type shown in my U.S. Pat. No. 4,284,210, in which each sensor consists of a magnetic float member cooperating with an associated reed switch to actuate the latter when the float member reaches the level of the reed switch. This particular sensor is also illustrated and described in detail in U.S. Pat. No. 3,703,246, and reference is made thereto for further disclosure.

The liquid level sensors 48 and 50 are connected to the intake valves 18, 20 and outlet valves 32, 34 of the tanks 12 and 14 via electrical connections for the purpose of actuating these valves to maintain desired levels of liquid in the tanks during operation of the static metering pump 10. These electrical connections pass, via electrical leads 88, through a control console 52 having on its face a control panel 54, in the manner shown in the aforementioned U.S. Pat. No. 4,284,210. The control console 52 incorporates electrical circuitry and/or a microcomputer programmed to cause the tanks 12 and 14 to empty alternately and successively, with one tank filling while the other is emptying, until a selected volume of liquid is metered. For this purpose, the control panel 54 is provided with the following switches and controls: a counter-preset and control 56, on-off switch 58, a filling switch 60, and a start switch 62.

The upper liquid level sensors 48 serve as sensors for the full level of liquid in the respective tanks 12 and 14, while the lower sensors 50 serve as sensors for the empty level of fluid in the tanks, that is the level at the end of tank discharge. Between the full level sensors 48 and the empty sensors 50 are the designated fluid volumes to be dispensed. For example, each lower sensor 50 may be pre-set so that the spacing between it and the fixed upper sensor 48 will result in the discharge of a fluid volume of precisely ten gallons from each tank.

The total volume of liquid to be dispensed is set by the operator on the counter-preset and control 56 of the control panel 54, for example a total volume of sixty gallons may be set. The static metering pump will then operate automatically to cause alternate emptying of the tanks 12 and 14 six times, so that exactly sixty gallons of liquid by volume are metered.

After setting the total volume to be metered, the operator initiates the operation of the static metering pump 10 by actuating the on-off switch 58 to energize the system and then depresses the filling switch 60 on the control panel 54, which sends an electrical signal to intake valves 18 and 20, causing the latter to open, and also sends an electrical signal to which adjusts the three-way valve 40 to permit flow from tank 12 and prevent flow from tank 14. Liquid then flows from an outside source through tube 22 and open intake valves 18 and 20, and fill both tanks 12 and 14. When the liquid level in tanks 12 and 14 reach the level of upper sensors 48, signals are transmitted to control console 52 which processes such "full" information and closes both intake valves 18 and 20. After both tanks are primed to their "full" capacity, the metering cycle is initiated by the operator actuating the start switch 62 on control panel 54, thereby sending a signal which opens the outlet valve 32 of tank 12 so that the latter begins to empty. When the level of liquid in tank 12 reaches the "empty" level, in registry with lower sensor 50, the latter generates a signal to control console 52, in response to which its microcomputer circuitry closes the outlet valve 32 of tank 12, so that exactly ten gallons has been dispensed therefrom. At the same time, the outlet valve 34 of tank 14 is opened to initiate discharge of liquid therefrom, and the intake valve of tank 12 is opened to cause the latter to re-fill. The tank 12 thus refills while the tank 14 is emptying to discharge its ten gallon load. When tank 12 reaches its "full" level, with the liquid level reaching the upper sensor 48, the latter transmits a signal which closes the intake valve 18. When the tank 14 is discharged to its "empty" level, its lower sensor 50, in response to the arrival of the liquid level in registry therewith, initiates a signal which closes the outlet valve 34 of tank 14, opens the outlet valve 32 of the filled tank 12, and opens the intake valve of tank 14 so that the latter starts to refill. In this manner, both tanks alternate successively in discharging and refilling until six discharges have been made, and a total of sixty gallons of liquid has been metered. At this time, the counter-preset and control 56 stops operation of the static metering pump 10.

The foregoing description sets forth the structure and operation of the static metering pump of my U.S. Pat. No. 4,284,210 as fully as is necessary for an understanding of the present invention. While this metering pump operates satisfactorily in metering precise volumes of fluid, it is subject to a disadvantage in that it measures and dispenses the fluid volumetrically rather than gravimetrically. As previously indicated, the volume of a liquid at a temperature of its maximum density is less than the volume of the same liquid at a higher temperature. Stated differently, one volumetric liter of liquid at its temperature of maximum density weighs more than a volumetric liter of the liquid at a higher temperature, so that at such higher temperature, a larger volume of liquid is required to achieve the same weight. In many metering applications, it is essential to meter the liquid gravimetrically and scales or other weighing apparatus are utilized to measure by weight the metered liquid.

For example, if the static metering pump 10 were used to dispense fifty gallons by volume of nitric acid which is stored in a filling tank outside the metering room, such fifty gallon volume of the acid at a temperature of 32° F. (0° C.) would weigh 594.9 pounds. In subsequent metering operations, the ambient temperature may rise, so that the nitric acid being measured is at a temperature of 68° F. (20° C.), and correspondingly decreased density, so that the weight of the same fifty gallon amount is now only 584.9 pounds. The ten pound difference constitutes a loss for the ultimate user and a serious inaccuracy in subsequent processing operations.

Various liquids undergo different changes in density proportionate to temperature changes. For example, ethyl alcohol metered under the same conditions as the nitric acid described above, will show a weight loss of only about three pounds as compared to ten pounds for the nitric acid. Curves showing the dependence of density on temperature are linear. Thus, in the instance of nitric acid, each temperature rise of 16.8° F. will result in a weight decrease of 1% for the same measured volume. Since these density/temperature curves for most liquids are available in chemical literature, or can be easily calculated, they can be used to adjust volumetric metering to compensate for the requirements of gravimetric measurement.

The invention herein contemplates adapting the type of static metering pump described above to achieve gravimetric control of the metering operation, although retaining the volumetric feed of the pump. This is achieved by selectively varying the size of the metering cavity or cavities employed in the pump, to compensate for density changes in the liquid being metered. For this purpose, each of the tanks 12 and 14 is shown in FIG. 1 to include a gravimetric adjustment assembly made in accordance with the present invention. The assembly may be manually operable, or may be automatically operable by the microcomputer within the control console of the static metering pump.

Figure 2:
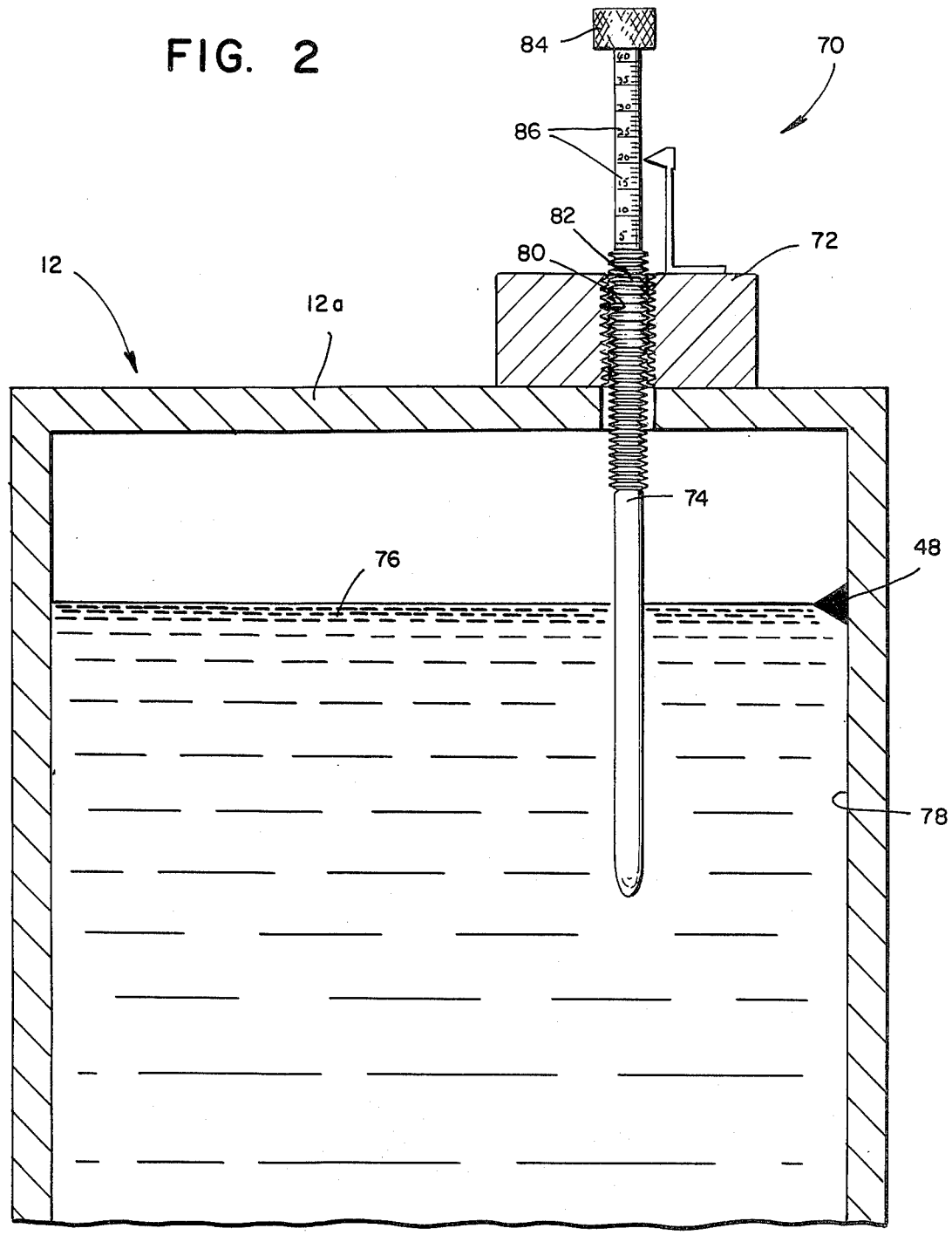
FIG. 2 is a side elevational view, shown partially in section, of a manually-operable gravimetric adjustment assembly which is used in the static metering pump of FIG. 1.

FIG. 2 shows, by way of example, the tank 12 provided with a gravimetric adjustment assembly 70 which is manually operable. The assembly 70 comprises a housing 72 secured to the top wall 12a of tank 12 and mounting a vertically-extending volume adjustment rod 74. The rod 74 extends from housing 72 through an aperture in the tank top wall 12a and projects into the interior of tank 12, its lower portion being immersed within the liquid 76 in said tank. It will be noted that the immersion of rod 74 within the liquid 76 is confined to the metering cavity 78 within the tank 12, that is the interior cavity of the tank between the "full" level defined by the upper sensor 48 and the "empty" level defined by the lower sensor 50. The rod 74 is sized to displace a selected quantity of liquid in the metering cavity 78, and thus change the internal volume capacity of said metering cavity, in a manner to be explained presently in greater detail.

The volume adjustment rod 74 is movably mounted in housing 72 in such a manner that it may be raised or lowered within said housing to vary the length of the rod which is suspended within the metering cavity 78. The means for movably mounting rod 74 is preferably screw means of fine and precise construction, whereby an operator may manually elevate and lower the rod 74 by selected small increments. For this purpose, the housing 72 is provided with a longitudinal through bore 80 which is internally threaded. The upper portion of rod 74 is formed with external threading 82 which is received within the internally-threaded bore 80 of housing 72. At its top end, the rod 74 terminates in a knurled adjustment knob 84 which is grasped by the operator for turning the rod 74 within housing 72 in a direction to either elevate or lower the rod by means of the screw threading. A vernier mechanism and scale (not shown) of well-known type may be incorporated in the assembly to provide fine, calibrated adjustment of the rod 74.

The volume adjustment rod 74 is elongated, narrow and cylindrical, and is of such length and diameter that it may accurately displace liquid in the tank metering cavity 78 in units of single milliliters. To visually indicate the amount of fluid displacement provided by rod 74, the body of the rod 74 may be provided with calibration indicia 86 calibrated, for example, in units of five milliliters and sub-calibrated in units of single milliliters, as shown in FIG. 2.

In practice, the lower liquid level sensor 50 is pre-set and spaced apart from the fixed upper liquid level sensor 48 at such a distance that the metering cavity 78 defined therebetween will hold the desired metered volume of liquid at the temperature of maximum density of the liquid and with the volume adjustment rod 74 lowered to its maximum extent within the metering cavity. The lowered rod 74 of course diminishes the internal capacity of the metering cavity 78, but the sensors 48 and 50 are so set that with its reduced capacity, the metering cavity will hold the exact volumetric metering charge. When the liquid is to be dispensed, its temperature is measured, and the difference in actual liquid volume calculated from the density change characteristics of the particular liquid in response to temperature change. To facilitate such calculation, the aforementioned temperature/density graphs may be consulted. When the actual increase in volume of the metered charge of liquid is determined (in milliliters), the rod 74 is elevated and withdrawn from the metering cavity 78 by the same number of milliliters. This results in the internal volumetric capacity of the metering cavity 78 being equal to the volume of the metered charge at the temperature of maximum density of the liquid, plus the increase in actual volume of the charge at its measured ambient temperatures.

As an example, assuming that the tank 12 is to dispense one liter of water, and the liquid displacement volume of the adjustment rod 74 at its maximum immersed extent is fifty ml, the liquid level sensors 48 and 50 are set so that the metering cavity 78, with its capacity reduced by the fully-immersed rod 74, will measure and hold exactly one liter of water at 4° C. The temperature of the water to be supplied to the tank 12 by the intake valve 18 is measured and found to be 50° C. The temperature/density graph for water shows that its maximum density (designated 1.0) is at 4° C., and that at 50° C. its density has declined to 0.9880, and that the volume of one liter of water has expanded to 1.012 liters for an increase of 12 ml. The adjustment rod 74 is thus withdrawn from the metering cavity 78 by a distance corresponding to 12 ml of its liquid displacement, which increases the volumetric capacity of the metering cavity by 12 ml. The metering cavity will now measure and retain a volumetric charge of 1.012 liters of water at 50° C. which has a weight of one Kg, i.e. the same weight as one liter of water at 4° C. The tank 12 has thus been adapted to meter by gravimetric adjustment of its volumetric measurement, and without the use of weighing devices or similar apparatus heretofore required for gravimetric control.

It will be understood that while the gravimetric adjustment assembly 70 and its operation has been described in connection with the tank 12, the same gravimetric adjustment would be made for the tank 14 of the static metering pump 10.

Figure 3:
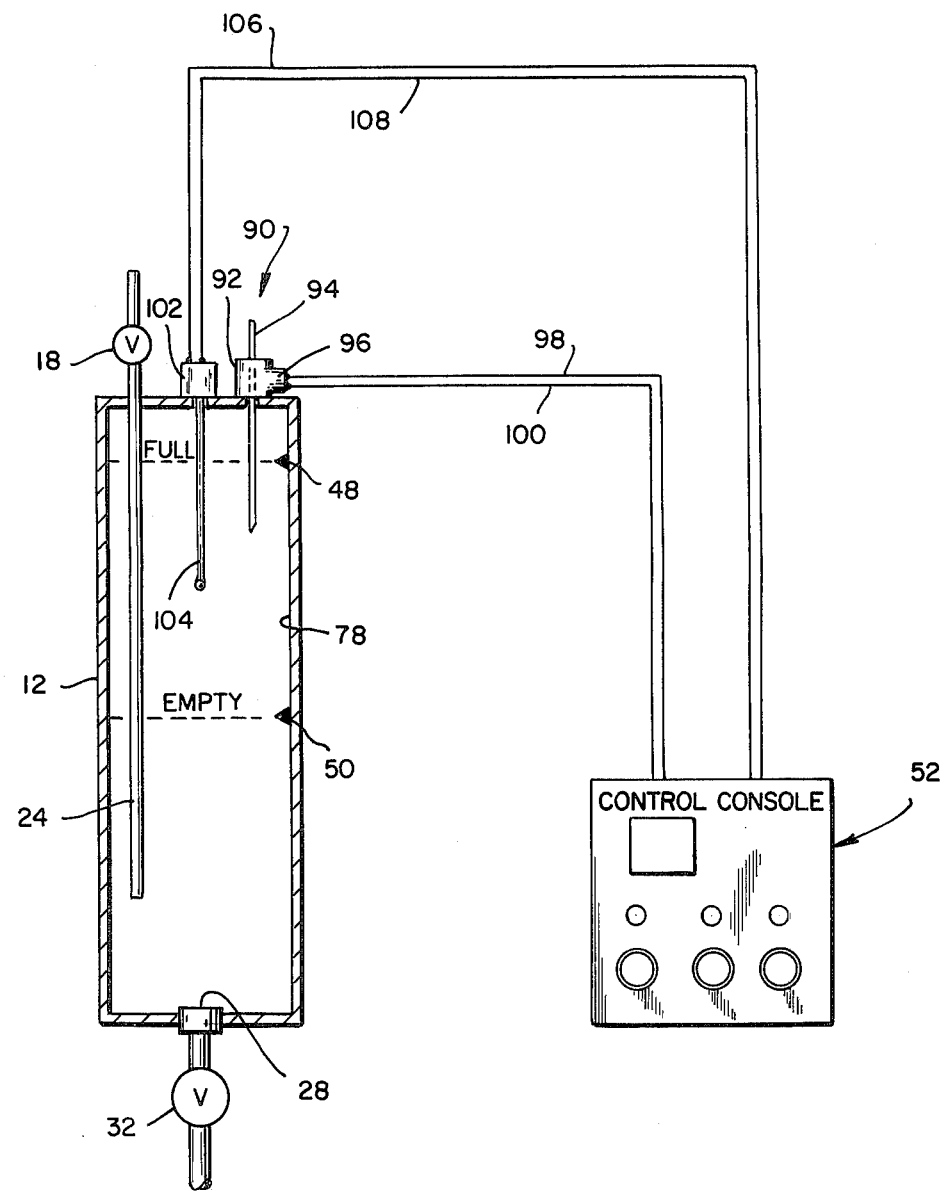
FIG. 3 is a schematic side elevational view of one of the tanks of the static metering pump of FIG. 1, showing an automatically-operated gravimetric adjustment assembly associated therewith.

In FIG. 3 there is shown a modified embodiment of gravimetric adjustment assembly which is automatic in operation and is controlled by the microcomputer within the control console 52. The gravimetric adjustment assembly 90 of this embodiment is shown associated with tank 12, and comprises a housing 92 within which a volume adjustment rod 94 is movably mounted. The rod 94 is of the same dimension as the adjustment rod 74 previously described, and may be again provided with external threading for elevating and lowering it. In this instance, the housing 92 encloses a reversible stepping motor 96 which is operatively coupled to the threading on rod 94 for raising and lowering the latter by small increments corresponding to milliliters. The stepping motor 96 is connected by leads 98 and 100 to the microcomputer within the control console 52, the leads 98 and 100 establishing a drive circuit, whereby the microcomputer may activate the stepping motor 96 in either direction.

The gravimetric adjustment assembly 90 also includes an electrical thermostat control 102 mounted on tank 12 and having an elongated temperature sensing probe 104 which projects into the interior of tank 12 and extends into the metering cavity 78. The thermostat control 102 is connected by leads 106 and 108 to the microcomputer within the control console 52, which leads 106 and 108 establish a temperature information relay circuit between the thermostat control 102 and the microcomputer.

During the metering operation, the temperature sensing probe 104 is immersed in the liquid within the metering cavity 78 so that it continually monitors the temperature of this liquid and relays such information to the thermostat control 102, which in turn transmits the monitored temperature reading to the microcomputer within control console 52. The microcomputer has a memory, within which is stored the temperature/density curve of the liquid being metered. When the microcomputer receives the monitored temperature reading from thermostat control 102, it is programmed to calculate the difference between the existing volumetric capacity of the metering cavity 78 and the desired volumetric capacity of the metering cavity for the liquid at the monitored temperature. Where such a difference exists, the microcomputer activates the stepping motor 96 to raise or lower the volume adjustment rod by the proper distance to increase or decrease the volumetric capacity of the metering cavity 78 by an amount corresponding to the calculated difference.

Where the same metering cavity is used at various times for the metering of different liquids, the microcomputer may be provided with different electronic modules, each having in its memory an appropriate temperature/density curve.

The automatically controlled gravimetric adjustment assembly shown in FIG. 3 has the advantage that it provides accurate metering, through constant temperature monitoring, where temperature fluctuations occur during the metering operation. If the temperature of the metered liquid is maintained constant during the metering operation, the manually operable assembly shown in FIG. 2 is practical and may be employed.

The gravimetric adjustment assemblies of the present invention have been shown and described as associated with the static metering pump of U.S. Pat. No. 4,284,210 by way of illustration only. It will be appreciated that the assemblies may be used advantageously in any metering system in which fluid is dispensed volumetrically from one or more metering cavities. The assemblies may also be used in liquid proportioning systems having volumetric discharge cavities, such as the proportioning system disclosed in my U.S. Pat. No. 3,960,295.

The assembly shown herein may also be used advantageously for calibrating of metering cavities in instances wherein the cavity capacity may change because of the nature of the liquid dispensed. For example, where viscous liquids are dispensed, the liquid may leave a film or other remainder of appreciable thickness on the walls of the metering cavity which decreases the actual volumetric capacity of the cavity by an unacceptable percentage. Since this quantity of liquid retention on wetted portions of a metering cavity is identical throughout all metering cycles or differs only by an insignificant degree, a calibration of the system becomes necessary before the metering operation is commenced. The apparatus shown herein may be employed for such calibration, by increasing the volumetric capacity of the metering cavity by the amount of decrease caused by the retained film on the cavity walls.

While preferred embodiments of the invention have been shown and described, it is obvious that numerous omissions, changes and additions may be made in such embodiments without departing from the spirit and scope of the invention.

What is claimed is:

1. In a metering tank containing adjustable means for varying the volumetric capacity of a liquid metering cavity within said tank to contain a selected volumetric charge of liquid to be dispensed,
   gravimetric adjustment apparatus for varying the selected internal volumetric capacity of said liquid metering cavity to compensate for density changes in said liquid resulting from variations in temperature, said adjustment apparatus comprising
   liquid displacement means comprising a solid elongated member positioned to extend into the interior of said metering cavity and to be immersed in the liquid charge therein, for reducing the volumetric capacity of said cavity by an amount equal to the volume of said elongated member which is immersed in said liquid, and fine precision adjustment means mounting said liquid displacement means for movement relative to said liquid metering cavity whereby said elongated member may be selectively advanced into the withdrawn from said cavity in uniform fractional increments, said liquid displacement means having a fully-inserted position in which it reduces the capacity of said liquid metering cavity by an amount sufficient to contain a precise selected adjusted volumetric charge of the liquid to be dispensed at the temperature of maximum density of said liquid, said mounting means being adapted to withdraw said liquid displacement means from its fully-inserted position by selected amounts determined by decrease in density of the fluid at ambient temperature, whereby to increase the volumetric capacity of said cavity to contain a charge of liquid weighing the same as the selected volumetric charge of said liquid at its temperature of maximum density, microcomputer means having a memory storing the temperature/density characteristics of said liquid, means for measuring the ambient temperature of the liquid in said cavity and for feeding temperature measurement information to said microcomputer, and means operatively coupling said microcomputer means to the mounting means for said liquid displacement means.

2. Gravimetric adjustment apparatus according to claim 1 in which said liquid displacement means comprises a member having an elongated body of uniform cross-section projecting into the interior of said liquid metering cavity, said member being mounted adjacent said cavity with the free end portion of said body extending into said cavity.

3. Gravimetric adjustment apparatus according to claim 2 in which said liquid displacement member comprises a bar having an elongated body of uniform cross-section, and said mounting means includes screw means for moving said bar.

4. Gravimetric adjustment apparatus according to claim 3 in which said bar body is calibrated in increments constituting fractions of the volmetric charge of liquid in said cavity, whereby the degree of immersion of said bar within the liquid in said cavity may be visually determined.

5. A method of adjusting the volumetric capacity of a liquid metering cavity adjustably and selectively set to dispense a precise selected volumetric charge of a liquid, said method comprising the steps of (a) determining the temperature/density function characterisitc for the liquid to be dispensed, (b) inserting a solid elongated liquid displacement member of uniform cross-section into said liquid metering cavity to a position in which the free end portion of said member is immersed in the liquid charge therein, to decrease the internal volume of said metering cavity, (c) setting the volumetric capacity of said metering cavity with said liquid displacement member inserted therein to contain said selected volumetric charge of said liquid at its temperature of maximum density, (d) measuring the ambient temperature of said liquid, and (e) withdrawing said liquid displacement member from said metering cavity by an amount determined by said temperature/density function to increase the internal volume of said cavity sufficiently to hold a volumetric charge of said liquid having a weight equal to the selected volumetric charge of said liquid at its maximum density.

6. A method according to claim 5 in which the steps of measuring the ambient temperature of said liquid, and withdrawing and inserting said liquid displacement members are performed manually.

7. A method according to claim 5 in which the steps of measuring the ambient temperature of said liquid, and withdrawing said liquid displacement member are performed by a microcomputer having a memory in which is stored the temperature/temperature/density function characteristic for said liquid.

8. A method according to claim 7 in which said microcomputer performs the additional step of constantly monitoring the temperature of said liquid during the dispensing operation, and withdrawing or advancing said liquid displacement member to further adjust the internal volume of said liquid metering cavity in accordance with ambient temperature variations by amounts determined by said temperature/density function.

* * * * *